US005388611A

United States Patent [19]

Harris

[11] Patent Number: 5,388,611

[45] Date of Patent: Feb. 14, 1995

[54] TANK VENTING AND VAPOR RECOVERY SYSTEM

[75] Inventor: Robert S. Harris, Connersville, Ind.

[73] Assignee: Stant Manufacturing Inc., Connersville, Ind.

[21] Appl. No.: 209,717

[22] Filed: Mar. 14, 1994

Related U.S. Application Data

[62] Division of Ser. No. 822,616, Jan. 17, 1992, Pat. No. 5,318,069.

[51] Int. Cl.[6] .............................................. F16K 24/00

[52] U.S. Cl. .................................. 137/588; 137/110; 123/519

[58] Field of Search ......................... 137/588, 110, 39; 123/519

[56] References Cited

U.S. PATENT DOCUMENTS

| | | | |
|---|---|---|---|
| 4,714,172 | 12/1987 | Morris | 220/86 R |
| 4,742,809 | 5/1988 | Ito et al. | 123/519 |
| 4,770,677 | 9/1988 | Harris | 55/168 |
| 4,790,349 | 12/1988 | Harris | 137/587 |
| 4,816,045 | 3/1989 | Szlaga et al. | 55/168 |
| 4,836,835 | 6/1989 | Harris et al. | 55/168 |
| 4,887,578 | 12/1989 | Woodcock et al. | 123/519 |
| 4,944,779 | 7/1990 | Szlaga et al. | 55/168 |
| 4,953,583 | 9/1990 | Szlaga | 137/118 |
| 5,028,244 | 7/1991 | Szlaga | 55/170 |
| 5,065,782 | 11/1991 | Szlaga | 137/39 |
| 5,099,880 | 3/1992 | Szlaga et al. | 137/587 |
| 5,156,178 | 10/1992 | Harris | 220/86 R |

*Primary Examiner*—A. Michael Chambers
*Attorney, Agent, or Firm*—Barnes & Thornburg

[57] ABSTRACT

An apparatus is provided for controlling discharge of fuel vapors from a vehicle fuel tank having a filler neck. The apparatus comprises a housing defining an interior region, the housing being formed to include first and second inlet ports, a signal port, and an outlet port. The apparatus further comprises a first valve assembly movable between a blocking position preventing fuel vapor received from the first inlet port from flowing through the interior region during vehicle refueling and a venting position allowing fuel vapor received from the first inlet port to flow through the interior region to the outlet port during vehicle operation. A signal passageway extends between the filler neck and the signal port to expose the first valve assembly to fuel vapor pressure from the filler neck to move the first valve assembly toward its venting position during vehicle operation. The apparatus further comprises second valve assembly movable between a blocking position preventing fuel vapor received from the second inlet port from flowing through the interior region when the first valve assembly is positioned in its venting position during vehicle operation and a venting position allowing fuel vapor received from the second inlet port to flow through the interior region to the outlet port when the first valve assembly is positioned in its blocking position during the vehicle refueling.

13 Claims, 5 Drawing Sheets

TANK VENTING AND VAPOR RECOVERY SYSTEM

This application is a division of application Ser. No. 07/822,616, filed Jan. 17, 1992, now U.S. Pat. No. 5,318,069 issued Jun. 7, 1994.

BACKGROUND AND SUMMARY OF THE INVENTION

The present invention relates to systems for controlling venting of fuel vapors from a vehicle fuel tank. More particularly, the present invention relates to systems including control valve assemblies for venting fuel vapor from the fuel tank via a first vent path during vehicle operation and for venting fuel vapor from the fuel tank via a second vent path during vehicle refueling.

It is well understood that significant quantities of fuel vapor can escape from a fuel tank through the filler neck to the atmosphere during the refueling of motor vehicles. Early attempts to control the vapor escape focused upon control devices fitted to the fuel dispensing nozzle. Later, control devices mounted directly on-board the vehicle (and thus referred to as "on-board vapor recovery" systems or "OBVR" systems) were developed. See, for example, U.S. Pat. No. 4,836,835, relating to a vacuum-actuated vapor recovery system mounted on the fuel tank filler neck. OBVR systems which mount to the fuel tank have also been developed.

In addition to controlling vapor escape, well-designed OBVR systems also assist in controlling the amount of liquid fuel which can be pumped into the fuel tank during refueling. For safety reasons, fuel systems are designed so that the fuel tank is never completely filled with liquid fuel. Rather, at least a predetermined portion of the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically shut the pump nozzle off. To assist in preventing tank overfill under such conditions, the OBVR system is usually provided with a fill-limit valve which prevents the escape of vapor through the OBVR system, and thus assists in triggering the nozzle shut-off mechanism, when the level of liquid fuel in the fuel tank has risen to a predetermined level.

It has also long been recognized that fuel vapor is generated in the fuel tank during operation of the vehicle, for example, by evaporation or by sloshing of the liquid fuel against the walls of the tank. Excessive pressure can build up in the fuel tank as a result of the newly-formed fuel vapor unless control devices are provided to vent the fuel vapor from the fuel tank during vehicle operation. Such valves have been referred to as "run-loss" valves or tank venting rollover valves because they handle fuel vapor loss during vehicle run and are capable of preventing liquid fuel carry over during vehicle rollover.

Coincident with developing OBVR systems to handle venting of fuel vapor during refueling, fuel systems engineers pursued advancements in tank pressure control systems, particularly run-loss valves for venting the fuel tank during vehicle operation. One driving force behind such advancements was the need to provide run-loss valves having very large flow capacities. For example, prior valves typically had flow orifices in the range of 0.050 inch diameter or smaller. Current valves might have flow orifice diameters as large as 0.290 inch.

Presumably, one might wish to use a high flow capacity run-loss valve with, for example, a tank-mounted OBVR system including fill limit control to provide a comprehensive vapor recovery and pressure control system. But it is contemplated that a parallel arrangement of the run-loss valve with the OBVR system would prove unacceptable because the two tend to work at odds with one another in controlling overfill of the fuel tank.

During refueling of a fuel tank provided with a parallel arrangement of a run-loss valve and an OBVR system, the fill-limit control valve in the OBVR system will close off the OBVR system, preventing further escape of fuel vapor, when a predetermined amount of liquid fuel has been pumped into the tank. However, the high-flow capacity run-loss valve will tend to remain open, continuing to allow escape of fuel vapor and thus allowing additional liquid fuel to be pumped into the fuel tank. It would thus be desirable to provide a tank venting and vapor recovery system capable of selectively providing venting through either a run-loss valve or an OBVR valve while properly preventing tank overfill.

According to the present invention, an apparatus is provided for controlling discharge of fuel vapors from a vehicle fuel tank having a filler neck. The apparatus is particularly suited for controlling venting of fuel vapor from a first vent valve (for example, a run-loss valve) and a second vent valve (for example, an OBVR system).

In particular, the controlling apparatus comprises a housing defining an interior region. The housing is formed to include first and second inlet ports connecting the interior region in fluid communication with the fuel tank. The housing is also formed to include a signal port connecting the interior region in fluid communication with the filler neck, and an outlet port.

The controlling apparatus further includes a first valve assembly movable between a blocking position and a venting position. When moved to its blocking position, the first valve assembly prevents fuel vapor received from the first inlet port from flowing through the interior region during vehicle refueling. When positioned in the venting position, the first valve assembly allows fuel vapor received from the first inlet port to flow through the interior region to the outlet port during vehicle operation.

The controlling apparatus further includes a signal passageway extending between the filler neck and the signal port to expose the first valve assembly to fuel vapor pressure from the filler neck. Filler neck pressure thus moves the first valve assembly toward its venting position during vehicle operation.

The controlling apparatus further includes a second valve assembly also movable between a blocking position and a venting position. When moved to its blocking position, the second valve assembly prevents fuel vapor received from the second inlet port from flowing through the interior region. Advantageously, the second valve assembly is maintained when the first valve assembly is moved to its venting position during vehicle operation. When the second valve assembly is positioned in its venting position, fuel vapor received from the second inlet port is able to flow through the interior region to the outlet port. Also advantageously, the first valve assembly is maintained in its blocking position when the second valve assembly moves to its venting position during vehicle refueling.

Further advantageously, the first valve assembly is initially actuated to move away from its blocking position by fuel vapor pressure received from the filler neck, but then is further depressed by fuel vapor pressure received from the fuel tank. This helps ensure that the first valve assembly maintains the second valve assembly in its blocking position during vehicle operation.

In accordance with one aspect of the invention, the controlling apparatus further includes a flow tube extending between the first inlet port and the first valve assembly. The flow tube includes a valve seat and the first valve assembly includes a rigid valve body sized to sealingly engage the valve seat. The first valve assembly further includes a flexible member linked to the rigid valve body and deformable under a predetermined amount of fuel vapor pressure received from the signal port to move the rigid valve body out of engagement with the valve seat to place the first valve assembly in its venting position.

Additional objects, features, and advantages of the invention will become apparent to those skilled in the art upon consideration of the following detailed description of preferred embodiments exemplifying the best mode of carrying out the invention as presently perceived.

Figure 2A:
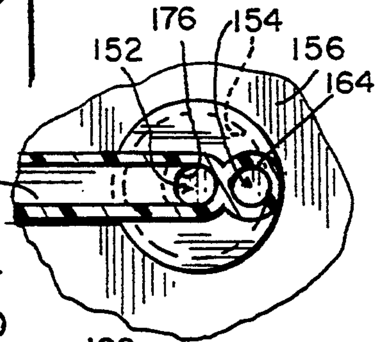
FIG. 2 is a sectional side view of another embodiment of a control apparatus for a tank venting and vapor recovery system, showing the provision of a vacuum relief valve.
Figure 2:
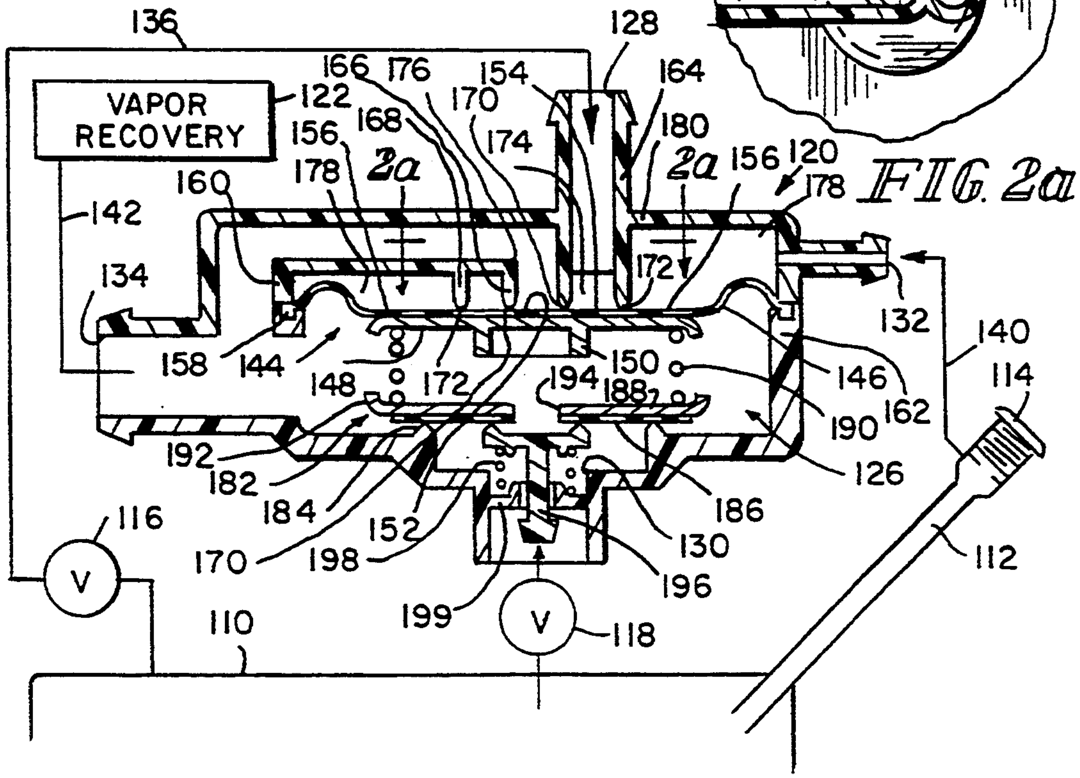
Figure 3:
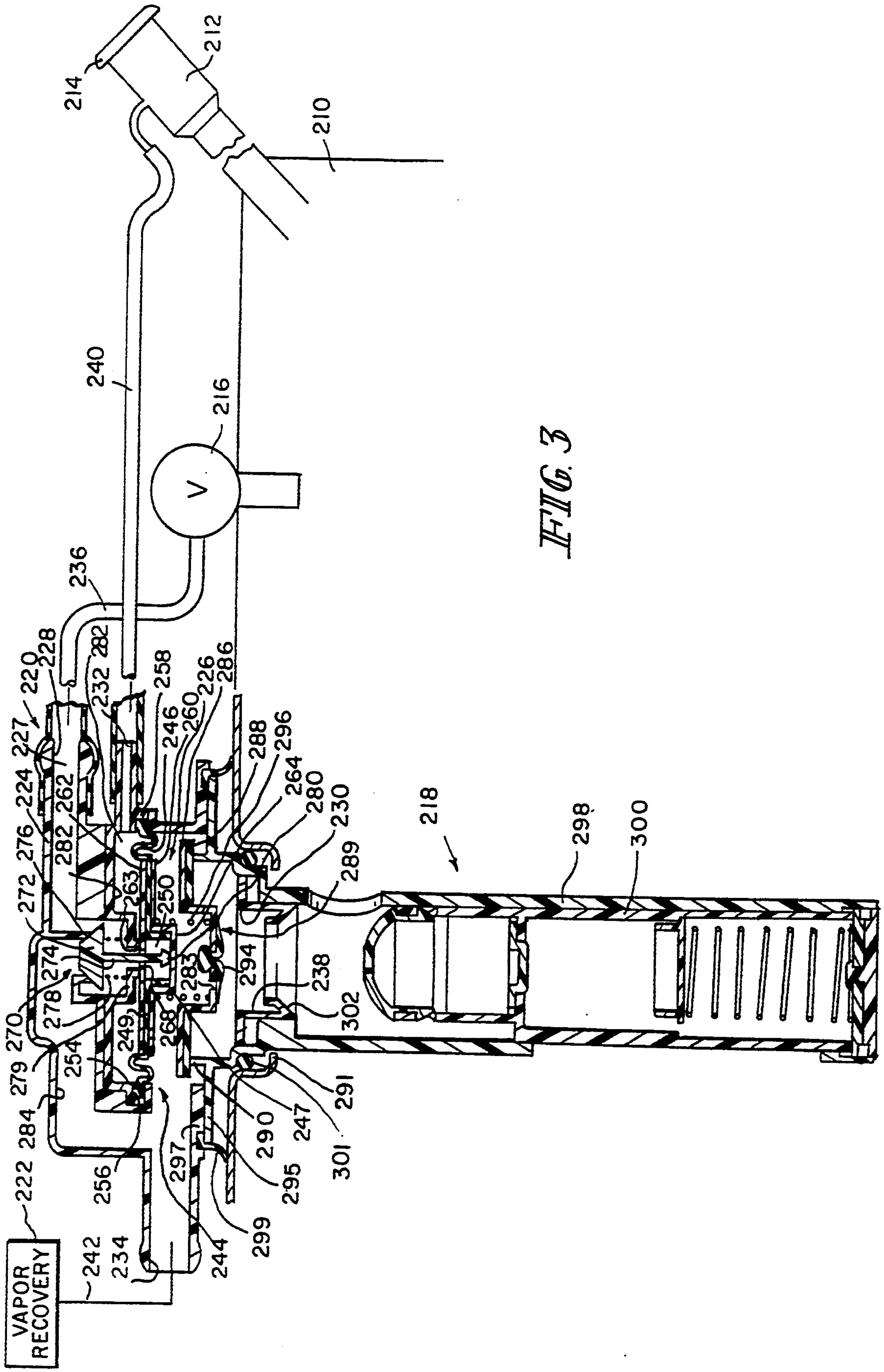
Figure 4:
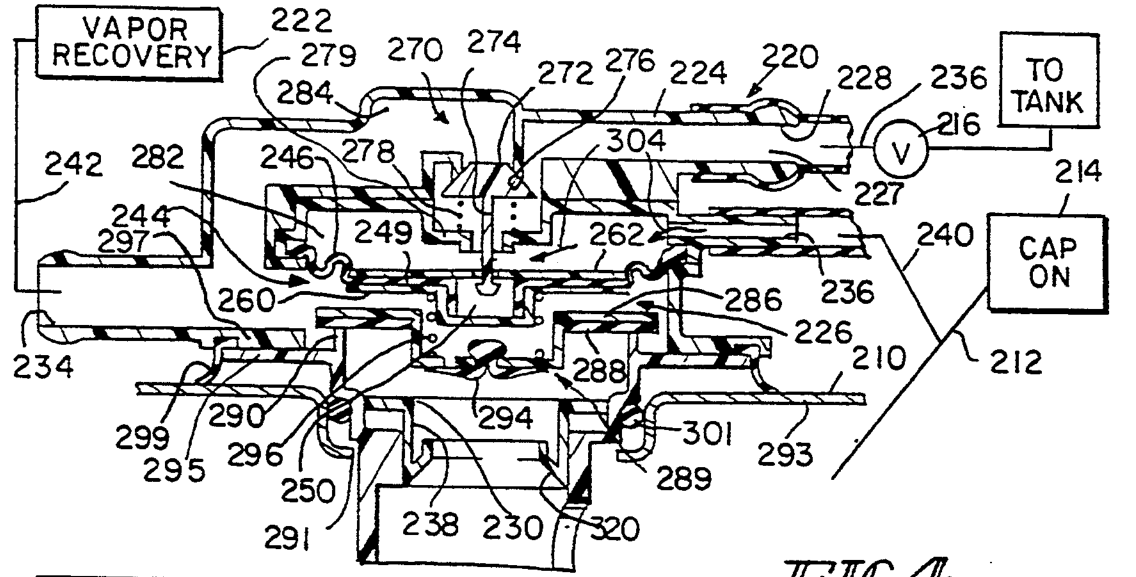
Figure 5:
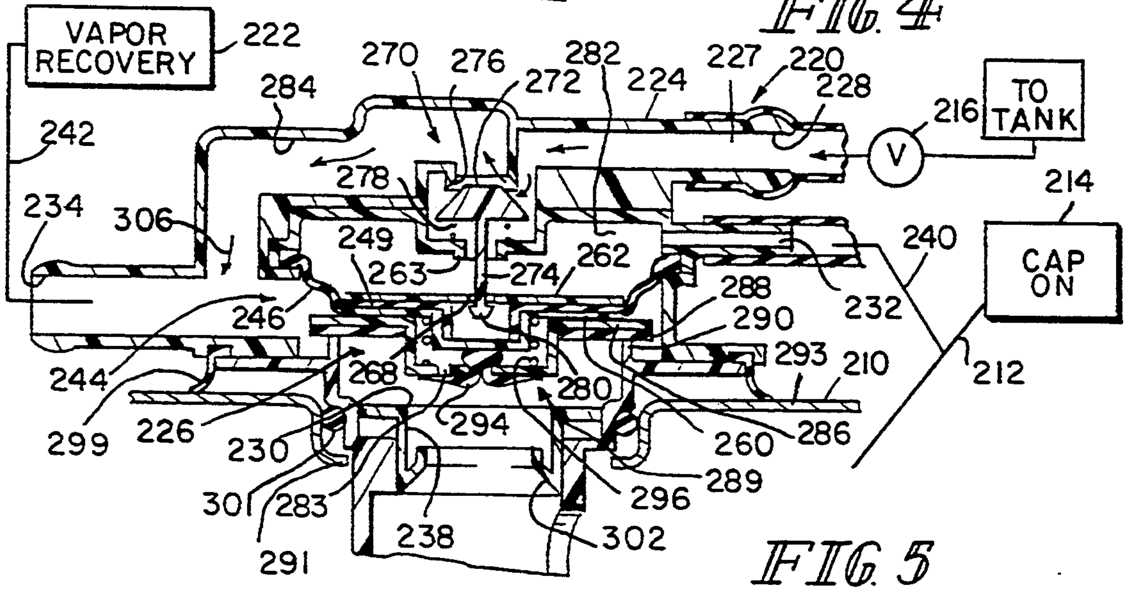
Figure 6:
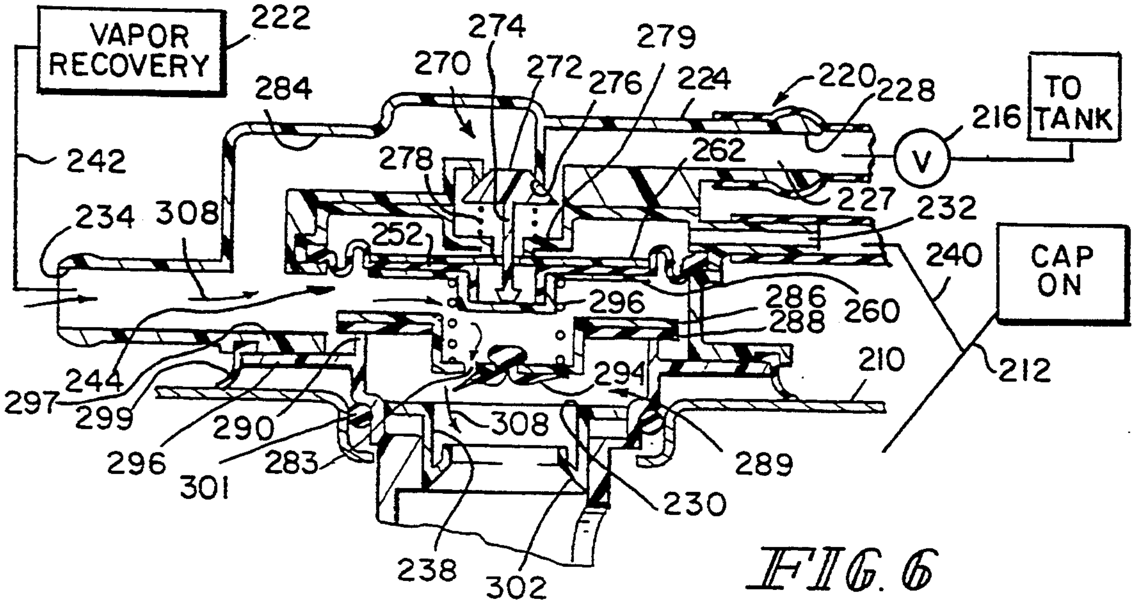
Figure 7:
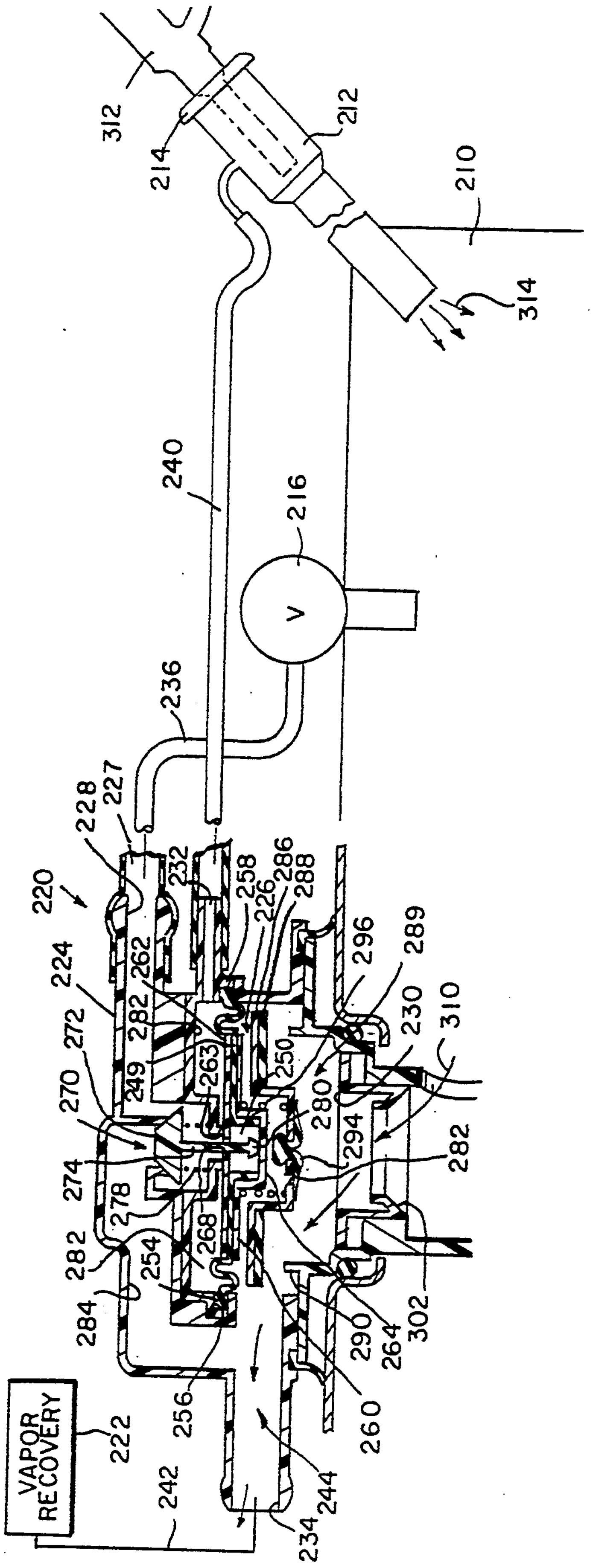
Figure 8:
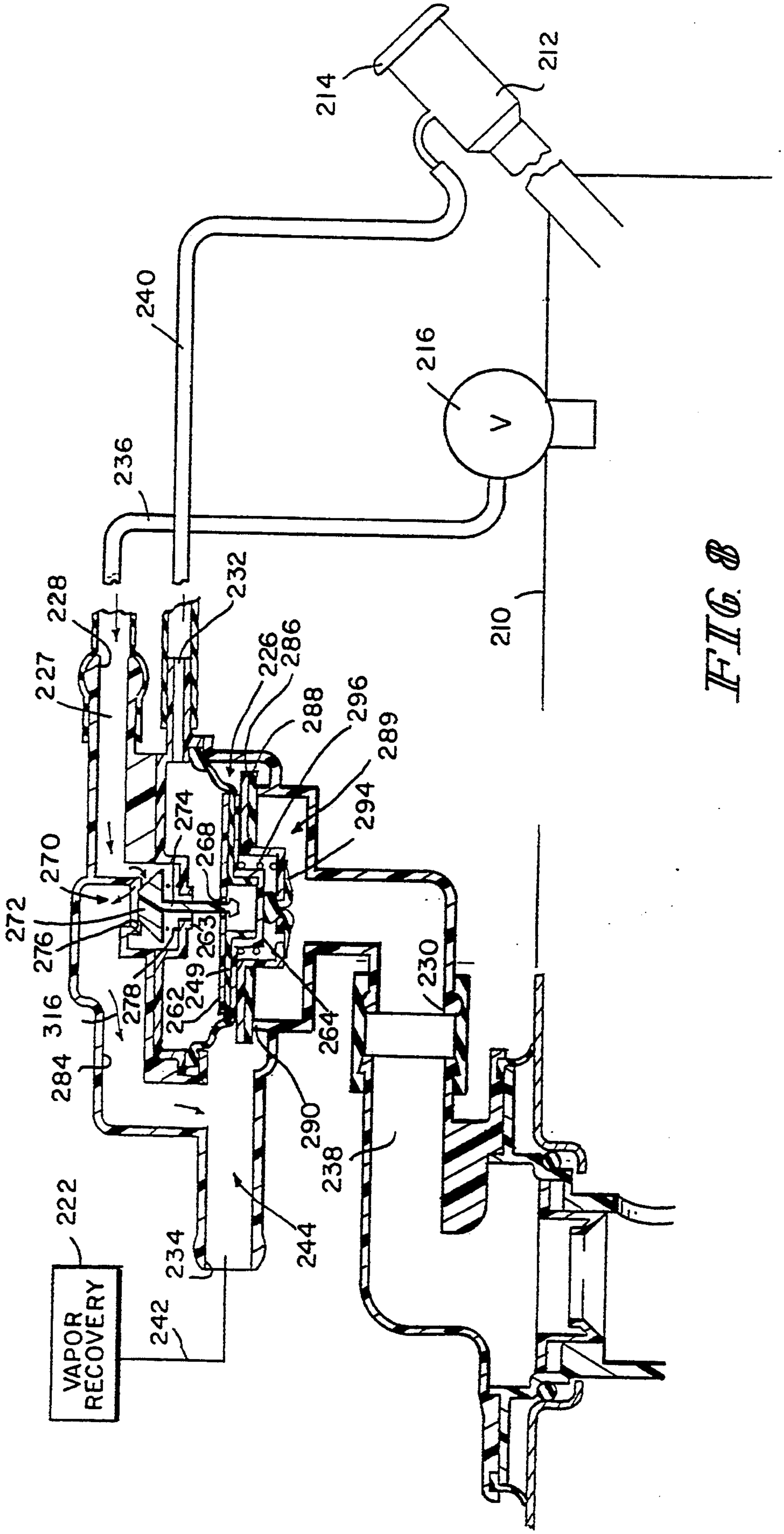

FIG. *2a* is a partial sectional view of the control apparatus of FIG. 2 showing a flow tube extending into an intermediate annular portion of a first valve assembly to conduct fuel vapor pressure from the fuel tank thereto;

FIG. 3 is a sectional side view of yet another embodiment of a control apparatus for a tank venting and vapor recovery system, showing the detail of a fill limit valve connected to the control apparatus;

FIG. 4 is a partial sectional side view of the control apparatus of FIG. 3 showing the diaphragm valve moving away from its blocking position toward its venting position during operation of the vehicle at low fuel tank pressures;

FIG. 5 is a partial sectional side view of the control apparatus of FIG. 3 showing the diaphragm valve in its venting position allowing venting of fuel vapor from the fuel tank during normal vehicle operation at high tank pressures;

FIG. 6 is a partial sectional side view of the control apparatus of FIG. 3 showing operation of the control apparatus during vehicle operation under tank vacuum conditions;

FIG. 7 is a partial sectional side view of the control apparatus of FIG. 3 showing the pressure relief valve moved to its venting position allowing fuel vapor to vent from the fuel tank during refueling; and FIG. 8 is a sectional side view of yet another embodiment of a control apparatus for a tank venting and vapor recovery system showing the control valve remotely mounted from the fill limit valve.

DETAILED DESCRIPTION OF THE DRAWINGS

Figure 1:
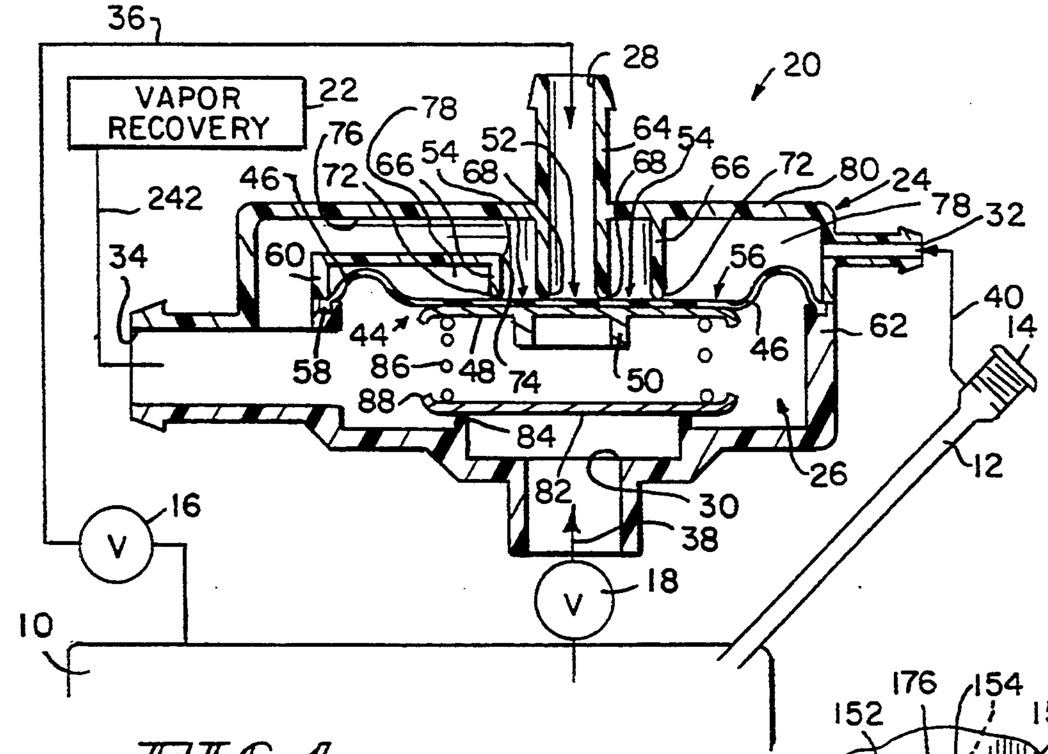
FIG. 1 is a sectional side view of one embodiment of a control apparatus for a tank venting and vapor recovery system, the remainder of the system being illustrated diagrammatically.

A preferred embodiment of a fuel tank venting and vapor recovery system in accordance with the present invention is illustrated in FIG. 1. The system is operable to control venting and vapor recovery from a vehicle fuel tank 10 having a filler neck 12. A fuel cap 14 sealingly engages the upper end of filler neck 12 during normal vehicle operation.

The tank venting and vapor recovery system includes a run-loss valve 16, a fill-limit valve 18, and a control valve 20 for controlling venting from the run-loss valve 16 and the fill-limit valve 18 respectively. Control valve 20 is connected to a fuel vapor recovery device 22, which may be a carbon canister or other art recognized device.

Run-loss valve 16 is typically a valve of the type shown, for example, in U.S. Pat. No. 5,028,244 issued to Szlaga or U.S. Pat. No. 5,065,782 to Szlaga, relevant portions of which are incorporated by reference herein. Run-loss valve 16 functions to vent substantial volumes of fuel vapor from the fuel tank during vehicle operation to maintain appropriate operating pressure in the fuel tank. As those of ordinary skill in the art will appreciate, run-loss valve 16 may be one of a variety of commercially available run-loss valves.

Fill-limit valve 18 may be of the variety shown in detail in FIG. 3 and described hereinbelow. As noted above, fill limit valve 18 rises on rising liquid fuel and closes at a predetermined liquid fuel level, preventing additional fuel vapor from venting through control valve 20. This creates a vapor blanket or pressure head above the liquid fuel in fuel tank 10 which acts to force fuel up filler neck 12 at the proper point during vehicle refueling to trigger a fuel nozzle shut-off device.

Control valve 20 includes a housing 24 which defines an interior region 26. Housing 24 is formed to include a first inlet port 28, a second inlet port 30, a signal port 32, and an outlet port 34. A vapor inlet passageway 36 extends between run-loss valve 16 and first inlet port 28 and cooperates with first inlet port 28 to connect interior region 26 in fluid communication with fuel tank 10. Vapor inlet passageway 36 and first inlet port 28 thus serve as first means for conducting fuel vapor from fuel tank 10 to interior region 26.

Likewise, a vapor inlet passageway 38 extends between fill-limit valve 18 and second inlet port 30 and cooperates with second inlet port 30 to connect interior region 26 in fluid communication with fuel tank 10. Vapor inlet passageway 38 and second inlet port 30 thus serve as second means for conducting fuel vapor from fuel tank 10 to interior region 26.

Signal port 32 connects interior region 26 to filler neck 12 by way of a signal passageway 40. Signal passageway 40 and signal port 32 together provide third means for conducting fuel vapor from the filler neck to interior region 26 to assist in actuating control valve as described below.

A vapor outlet passageway 42 extends between outlet port 34 and vapor recovery device 22. Because vapor recovery device 22 is exposed to atmospheric pressure, vapor outlet passageway 42, and any portion of interior region 26 connected via outlet port 34 in fluid communication therewith, is also exposed to atmospheric pressure.

A first valve assembly 44 is disposed in interior region 26. First valve assembly 44 is movable between a blocking position preventing fuel vapor received from first inlet port 28 from flowing through interior region 26 to outlet port 34 and a venting position allowing fuel vapor received from first inlet port 28 to flow through interior region 26 to outlet port 34, and subsequently through outlet passageway 42 to vapor recovery device 22. Thus, first valve assembly 44 serves as first valve means for selectively blocking flow of fuel vapors from first vapor inlet passageway 36 and first vapor inlet port 28 through interior region 26.

First valve assembly 44 includes a flexible diaphragm 46 and a backing plate 48 appended to diaphragm 46 for movement therewith. Backing plate 48 includes an extension or stop 50. First valve assembly 44 also includes a central portion 52 corresponding to the central portion of diaphragm 46, an intermediate annular portion 54 concentric with central portion 52 and corresponding with the intermediate portion of diaphragm 46, and an outer circumferential portion 56 corresponding with the outer circumferential portion of diaphragm 46. Diaphragm 46 is mounted in interior region 26 by its peripheral edge 58 which is sandwiched between portions of an interior wall 60 of housing 24 and an exterior wall 62 thereof.

One important advantage of the embodiment of the invention illustrated in FIG. 1 is that it provides a concentric venting flow path for venting of fuel vapor received at first inlet port 28 from fuel tank 10 by way of run-loss valve 16. In the concentric venting flow path, central portion 52 is exposed to fuel vapor pressure from fuel tank 10 via first inlet port 28, outer circumferential portion 56 is exposed to fuel vapor pressure from filler neck 12 via signal port 32, and intermediate portion 54 is exposed to atmospheric pressure via outlet port 34. The concentric flow path is effected by cooperation between a flow tube 64, an annular partition 66, walls 60 and 62 of housing 24, and diaphragm 46 itself.

In particular, flow tube 64 connects first inlet port 28 with central portion 52 to expose central portion 52 to fuel vapor pressure exhausted from fuel tank 10 and passing thereafter through run-loss valve 16 and first vapor inlet passageway 36 to reach first inlet port 28. Flow tube 64 is preferably of relatively large diameter (for example, 0.290 inch) to handle the large volumes of fuel vapor exhausted from fuel tank 10 through run-loss valve 16. Flow tube 64 terminates in a first valve seat 68 against which diaphragm 46 seats when first valve assembly 44 is in its blocking position as illustrated in FIG. 1. For purposes of describing this embodiment of the invention, first valve seat 68 defines the border between central portion 52 and intermediate portion 54.

Annular partition 66 lies in spaced-apart relationship with flow tube 64 and surrounds it so as to define an intermediate annular chamber 70. Annular partition terminates in a second valve seat 72 defining the border between intermediate portion 54 and outer circumferential portion 56.

Annular partition 66 also is formed to include an opening 74 placing intermediate annular chamber 70 in fluid communication with an outlet tube 76 which in turn is linked to outlet port 34. Because intermediate annular chamber 70 is thus open to outlet port 34, chamber 70 and, correspondingly, intermediate portion 54, are exposed to atmospheric pressure.

Annular partition 66 also cooperates with housing 24 to define an outer circumferential chamber 78. Outer circumferential chamber 78 is bordered by walls 60, 62 of housing 24, and a top wall 80 thereof, as well as by annular partition 66 and outer circumferential portion 56 of diaphragm 46. Chamber 78 is open to signal port 32 so that chamber 78, and portion 56 of diaphragm 46, are exposed to fuel vapor pressure from filler neck 12. As described below, this fuel vapor pressure signal from filler neck 12 acts upon outer circumferential portion 56 to move diaphragm 46 from its blocking position toward its venting position, allowing venting to occur during vehicle operation to properly regulate pressure in fuel tank 10.

A second valve assembly 82 is positioned in interior region 26 to provide an on-board vapor recovery function during vehicle refueling. Second valve assembly 82, which may be a standard valve plate or poppet valve, is positioned for sealing engagement with a valve seat 84. Second valve assembly 82 is movable between a blocking position (illustrated in FIG. 1) preventing fuel vapor received from second inlet port 30 from flowing through interior region 26 and a venting position (not shown) allowing fuel vapor received from second inlet port 30 to flow through interior region 26 to outlet port 34. Second valve assembly 82 thus serves as second valve means for selectively blocking flow of fuel vapor from second inlet passageway 38 and second inlet port 30 to interior region 26.

Advantageously, a spring 86 extends between valve assembly 82 and backing plate 48 to serve as means for biasing second valve assembly 82 in opposition to first valve assembly 44. The outer edges 88 of backing plate 48 and valve assembly 82 may be curved to better retain spring 86 in its proper position. Spring 86 assists in maintaining second valve assembly 82 in its blocking position when first valve assembly 44 moves to its venting position, thus allowing control valve 20 to properly select between venting through first valve assembly 44 during vehicle operation and through second valve assembly 82 during vehicle refueling.

In operation, the embodiment the invention illustrated in FIG. 1 provides selective venting to vapor treatment site 22 through either the run-loss valve 16 or the fill-limit valve 18 by venting fuel vapor through either first valve assembly 44 or second valve assembly 82. In FIG. 1, control valve 20 is shown in a static configuration in which both first valve assembly 44 and second valve assembly 82 are in their respective blocking positions. It will be appreciated that during vehicle operation, first valve assembly 44 is positioned in its venting position, holding second valve assembly 82 in its blocking position. During vehicle refueling, the opposite configuration is reached; that is, second valve assembly 82 is moved to its venting position, assisting in holding first valve assembly 44 in its blocking position.

Specifically, during vehicle operation with fuel cap 14 securely mounted on filler neck 12, fuel vapor from fuel tank 10 can pass through run-loss valve 16 and through vapor inlet passageway 36 to reach first inlet port 28, from which it passes through flow tube 64 to impinge upon relatively small central portion 52 of diaphragm 46. At the same time, fuel vapor pressure from the upper portion of filler neck 12 travels through signal passageway 40, passing through signal port 32 to reach outer circumferential chamber 56. Although the fuel vapor from filler neck 12 is likely to be at a pressure slightly less than tank pressure, the fuel vapor acts across the relatively large outer circumferential portion 56 of diaphragm 46. It is thought that the filler neck pressure is likely to be less than tank pressure, at least when the fuel tank is filled with liquid fuel, because some pressure is lost when liquid fuel is lifted up filler neck 12.

Additionally, the underside of diaphragm 46 is exposed to atmospheric pressure received from outlet port 34. Thus, the combined force of tank pressure on central portion 52 and filler neck pressure on outer circumferential portion 56 is sufficient to depress or deform diaphragm 46 in opposition to spring 86, moving first valve assembly 44 away from its blocking position toward its venting position. This increases the pressure on spring 86, assisting in holding second valve assembly in its blocking position.

Diaphragm 46, when depressed in this fashion, simultaneously unseats from both first valve seat 68 and second valve seat 72. This allows fuel vapor in flow tube 66 to flow into intermediate annular chamber 54 and to pass to opening 74, from which the fuel vapor can flow through outlet tube 76 and through outlet port 34 to ultimately reach outlet passageway 42.

Some fuel vapor from flow tube 64 will tend to flow through intermediate annular chamber 70 to reach outer circumferential chamber 78, bringing the pressure in outer circumferential chamber 78 up from neck pressure to tank pressure. This is advantageous because it ensures that diaphragm 46 is fully depressed, so that stop 50 contacts valve assembly 82, assisting in preventing valve assembly 82 from moving out of sealing engagement with valve seat 84. Thus, second valve assembly 82 is held in its blocking position preventing fuel vapor received from second inlet 30 from reaching interior region 26. Thus, while neck pressure initially actuates diaphragm 46 to unseat diaphragm 46 from valve seats 68, 72, it is tank pressure which thereafter sets to depress diaphragm 46 and therefore to move first valve assembly 44 to its venting position.

During vehicle refueling, fuel cap 14 is removed from filler neck 12 so that pressure in filler neck 12, and hence in signal passageway 40, is atmospheric. The pressure in outer circumferential chamber 78, and correspondingly at outer circumferential portion 56 of diaphragm 46, is thus also atmospheric. Likewise, the pressure at the underside of diaphragm 46 is atmospheric. First valve assembly 44 therefore remains in its blocking position.

When fuel vapor pressure in fuel tank 10 increases to a predetermined amount (for example, about 1 kPa), second valve assembly 82 is moved away from valve seat 84 against the bias of spring 86 to its venting position allowing fuel vapor received from second inlet 30 to vent through interior region 26 to outlet port 34. Thus, advantageously, in this configuration, control valve 20 connects fill limit valve 18 in fluid communication with vapor outlet 34 while blocking fuel vapor from run-loss valve 16 from venting to outlet port 34. That is, in this configuration, control valve 20 properly performs the OBVR and fill limit functions without interference from run-loss valve 16.

It is contemplated that the ratio of the diameter of flow tube 64 to the diameter of diaphragm 46 will be kept relatively low. Of course, the diameter of flow tube 64 must be sufficient to handle the relatively large flow of fuel vapor exhausted through run-loss valve 16. However, because flow tube 64 conducts tank pressure to central portion 52 of diaphragm 46, as the flow tube diameter (and hence the central portion diameter) increases, there is a greater likelihood that the action of tank pressure on central portion 52 alone will move diaphragm 46 away from valve seats 68, 72 during refueling. By keeping the diameter ratio as low as possible, this potential problem can be avoided.

Another embodiment of the invention is illustrated in FIG. 2, in which features having reference numbers similar to those in FIG. 1 perform the same or similar function as they perform in FIG. 1. In the embodiment of FIG. 2, a first valve assembly 144 includes a diaphragm 146. First valve assembly 144 includes a central portion 152 corresponding to the central portion of diaphragm 146, an intermediate portion 154, and an outer circumferential portion 156.

However, in contrast to the embodiment of FIG. 1, central portion 152 is exposed to atmospheric pressure and intermediate portion 154 is exposed to fuel vapor pressure from fuel tank 10. In particular, flow tube 164 extends between first inlet port 128 and an intermediate annular chamber 174 defined between the walls of flow tube 164 and between partitions 166 and 168. Outer circumferential chamber 178 is similar to that in the embodiment of FIG. 1.

In FIG. 2*a*, a partial sectional view of control valve 120 is provided. As shown, central portion 152 of diaphragm 146 is exposed to atmospheric pressure received from outlet port 134 through opening 176. Flow tube 164 communicates with intermediate chamber 174. Wall 168 defines the border between outer circumferential chamber 178 and intermediate chamber 174.

Thus, in operation of the embodiment of FIG. 2 during operation of the vehicle, outer circumferential chamber is once again exposed to fuel vapor pressure from filler neck 112, received via signal port 132. Intermediate annular chamber 174 is exposed to fuel vapor pressure from fuel tank received via first inlet port 128. The underside of diaphragm 146 is exposed to atmospheric pressure as in the embodiment of FIG. 1. The combined force of neck pressure on the outer circumferential portion 156 and tank pressure on intermediate portion 154 causes first valve assembly 144 to move away from its blocking position toward its venting position, unseating from valve seats 170, 172.

Advantageously, the shifting of flow tube 164 to extend to intermediate annular chamber 154 may be important to prevent diaphragm 146 from unseating improperly from valve seats 170, 172. Specifically, it is thought that fuel vapor will reach that part of outer circumferential portion 156 which is closest to signal port 132 and may act on that part of portion 156 disproportionately, causing diaphragm 146 to tip by moving away from one of valve seats 170, 172 prior to moving away from the other. It is thought that shifting flow tube 164 to an offset position as shown in FIG. 2 can assist in preventing this tipping problem.

The embodiment of FIG. 2 also includes a second valve assembly 182 provided with a vacuum relief valve 196. An opening 194 is formed in valve assembly 182. A backing plate 186 appended to valve assembly 182 is also formed to include such an opening.

Vacuum relief valve 196 is a "T"-shaped member having a horizontal portion configured to sealingly engage backing plate 186 to prevent leakage of fuel vapor through opening 194. A spring 198 extends between horizontal portion 168 and a spring seat 199 formed in passageway 138. Spring 199 biases valve 196 into sealing engagement with plate 186.

Under vacuum conditions in fuel tank 10, valve 196 moves against the bias of spring 198 out of engagement with backing plate 186, allowing vacuum relief. As those of ordinary skill in the art will appreciate, any standard vacuum relief valves can be used in place of valve 196. For example, an umbrella-type valve as will be further described in reference to FIGS. 3–7.

Another embodiment of the claimed invention is illustrated in FIGS. 3–7 in which features having reference numbers similar to those in FIG. 1 perform the same or similar function as they perform in FIG. 1. As shown, e.g., in FIG. 3, this embodiment of the invention includes a valve assembly 244 which includes a diaphragm 246. The peripheral edge 254 of diaphragm 246 is sandwiched between walls 256 and 258 of housing 224. Diaphragm 246 includes a central portion 247 and an outer circumferential portion 249.

A pair of plates 260, 262 is appended to diaphragm 246 for movement therewith. Plates 260, 262 cooperate to define a central chamber 250 corresponding to central portion of diaphragm 247. Plate 260 includes a projection or stop 264. Plate 262 is formed to include an opening 268.

Valve assembly 244 also includes a rigid valve body 270. Valve body 270 includes a head 272 sized to sealingly engage a valve seat 276 to block flow of fuel vapor through flow tube 227. A spring 278 extending between an interior partition 279 and head 272 biases valve body 270 into engagement with valve seat 276. Valve body 270 also includes a post 274 extending through opening 268 into central chamber 250.

At the end of post 274 opposite head 272 is a projection or flange 280 which is larger in diameter at its uppermost portion than is opening 268. Post 274 extends a predetermined distance into central chamber 250 when valve assembly 244 is positioned in its blocking position as shown in FIG. 3.

Outer circumferential portion 249 of diaphragm 246 cooperates with an interior wall 256 and interior partition 279 to define an outer circumferential chamber 282. Outer circumferential chamber is open to signal port 232 to expose outer circumferential portion 249 to fuel vapor pressure from filler neck 212.

Second valve assembly 289 is similar to second valve assembly 182 shown in FIG. 2. Second valve assembly 289 includes valve plates 286, 288. Valve plate 288 sealingly engages a valve seat 290 when second valve assembly 289 is positioned in its blocking position. Valve plate 286 is formed to include an opening 292. An umbrella-type vacuum relief valve 294 mounted to valve plate 286 is movable relative to the opening in response to tank vacuum conditions.

Like the embodiments of FIGS. 1 and 2, the embodiment of FIG. 3 includes a spring 296 nested between second valve assembly 289 and first valve assembly 244. Spring 296 provides means for biasing second valve assembly 289 in opposition to first valve assembly 244.

Detailed construction of a fill-limit valve 218 is also shown in FIG. 3. Fill-limit valve 218 includes a housing 298 in which a fill-limit valve member 300 is movably received. The illustrated valve member 300 is similar to those described in U.S. Pat. Nos. 5,044,397 and 4,991,615 to Szlaga et al., relevant portions of which are hereby incorporated by reference. Valve member 300 is sized to engage a valve seat 302 formed in housing 298. It will be appreciated by those of ordinary skill in the art that a wide variety of fill-limit valves may be used in accordance with the invention described herein.

Housing 298 extends through an opening 291 in a top wall 293 of fuel tank 210. Housing 298 includes a circular flange 295 mateable with a similar flange 297 on control valve 220. A gasket 299 is sandwiched between flanges 295, 297 and extends to top wall 293 of fuel tank 210 to assist in preventing unwanted leakage of fuel vapor between housing 298 and the edges of top wall 293 defining opening 291. Additionally, an O-ring gasket 301 may be provided to further assist in preventing such leakage.

Operation of the embodiment of FIG. 3 during operation of the vehicle under low tank pressure conditions is illustrated in FIG. 4. Because the vehicle is in operation, fuel cap 214 is securely mounted on filler neck 212. Fuel vapor pressure in the filler neck is transmitted via signal passageway 240 to outer circumferential chamber 282. Thus, outer circumferential portion 249 of diaphragm 246 is exposed to fuel vapor pressure on one side as indicated by flow arrows 304 and atmospheric pressure on the other side. Diaphragm 246 therefore begins to move relative to rigid valve body 270 over a predetermined distance as shown in FIG. 3.

If tank pressure is relatively low (for example, less than 0.25 kPa) diaphragm 246 will not depress far enough for plate 260 to come into engagement with plate 286. Thus, rigid valve body 270 will remain seated against valve seat 276, blocking the flow of fuel vapor from flow tube 227 to outlet tube 284.

Preferably, the predetermined distance is calibrated so that diaphragm 246 moves at least 50% of its total movement distance before plate 260 engages plate 286. Advantageously, this provides a delay between the time of initial depression of diaphragm 246 and the movement of valve assembly 244 to its venting position by way of the unseating of rigid valve body 270 from valve seat 276. This allows for a buildup of tank pressure in outer circumferential chamber 282 to act against outer circumferential portion 249. When the tank pressure becomes high enough, as shown in FIG. 5, diaphragm 246 is fully depressed prior to venting fuel vapor past valve seat 276 to outlet tube 284, ensuring that second valve assembly 289 remains in its blocking position preventing unwanted sloshing of liquid fuel through second inlet port 230.

Particularly in FIG. 5, as diaphragm 246 has continued to depress due to fuel vapor pressure buildup in outer circumferential chamber 282, rigid valve body 270 unseats from valve seat 276, moving against the bias of spring 278 to place valve assembly 244 in its venting position allowing flow of fuel vapor through flow tube 227 to outlet tube 284 and ultimately to vapor outlet 234 as indicated by flow arrows 306.

In addition, valve assembly 289 is retained in its blocking position when valve assembly 244 is moved to its venting position. Plate 260 engages plate 286, and stop 264 may engage a portion of vacuum relief valve 294, preventing second valve assembly 289 from unseating from valve seat 290. Thus, during vehicle operation at high tank pressure conditions, all venting from fuel tank 210 occurs via flow tube 227, which receives fuel vapor output from run-loss valve 216; no venting occurs through second valve assembly 289.

Operation of the embodiment of FIG. 3 during tank vacuum conditions is shown in FIG. 6. There, both first valve assembly 244 and second valve assembly 289 are shown in their respective blocking positions. Vacuum relief valve 294 is shown moved away from opening 283 in response to tank vacuum conditions. Atmosphere can enter the fuel tank through opening 283 as illustrated by arrows 308 to relieve the vacuum condition.

Operation of the embodiment of FIG. 3 during vehicle refueling is illustrated in FIG. 7. Effectively, FIG. 7 shows control valve 220 performing its OBVR function. There, a liquid fuel 314 is introduced into fuel tank 210, fuel vapor pressure builds up in fuel tank 210 and acts against second valve assembly 289. However, because the upper filler neck is at atmospheric pressure, the pressure in outer circumferential chamber 282 is likewise atmospheric. Although tank pressure is received in central chamber 250 by way of first inlet port 228 and flow tube 227, it is insignificant since it acts only across relatively small central portion 247 of diaphragm 246.

Thus, second valve assembly 289 is moved against the bias of spring 288 away from its blocking position, unseating from valve seat 290. Fuel vapor received through second inlet port 230 can vent to outlet port 34 as indicated by arrows 310. Advantageously, when second valve assembly is moved to its venting position as illustrated in FIG. 7, the force on spring 288 is increased such that first valve assembly is prevented from moving away from its blocking position. Thus, fuel vapor exhausted through run-loss valve 216 cannot vent to outlet port 234.

When the level of liquid fuel in fuel tank 210 reaches a predetermined level, fill limit valve 218 (shown in FIG. 3) rises and seats against valve seat 302. This prevents further venting through second valve assembly 289.

Yet another embodiment of the invention is illustrated in FIG. 8. As the embodiment of FIG. 8 shows, a control valve in accordance with the present invention need not be mounted directly atop the fill-limit valve. Rather, control valve 220 may be provided with a passageway extension 336 to mate with a similar extension 338 on fill-limit valve 318. In other respects, this embodiment of the invention is identical in structure and function to the embodiment of FIGS. 3–7.

Although the invention has been described in detail with reference to certain preferred embodiments, variations and modifications exist within the scope and spirit of the invention as described and defined in the following claims.

I claim:

1. An apparatus for controlling discharge of fuel vapors from a vehicle fuel tank having a filler neck, the apparatus comprising a housing an interior region and being formed to include a first inlet port communicating with the interior region and an outlet part communicating with interior region, first means for conducting fuel vapor from the fuel tank to the interior region through the first inlet port, first valve means for selectively blocking flow of fuel vapors from the first conducting means through the interior region, the first valve means being movable in response to fuel vapor pressure received from the first conducting means between a blocking position preventing fuel vapor received from the first conducting means from flowing through the interior region to the outlet port and a venting position allowing fuel vapor received from the first consulting means to flow through the interior region to the outlet port, second means for conducting fuel vapor from the fuel tank to the interior region, second valve means for selectively blocking flow of fuel vapors from the second conducting means to the interior region, the second valve means being movable in response to fuel vapor pressure received from the second conducting means between blocking position blocking flow of fuel vapor from the second conducting means through the interior region to the outlet port when the first valve means is positioned in its venting position and a venting position allowing flow of fuel vapor from the second conducting means through the interior region to the outlet port when the first valve means is positioned in its blocking position, and third means for conducting fool vapor from the filler neck to the first valve means to move the first valve means from its blocking position toward its venting position, the first valve means including a central portion, an intermediate portion, concentric with the central portion, and an outer circumferential portion and further comprising an outlet tube extending between the central portion and the outlet port to expose the central portion to atmospheric pressure, and a flow Lube extending between the first inlet port and the intermediate portion to expose the intermediate portion to fuel vapor from the fuel tank, the flow tube extending into the interior region in spaced-apart relationship with the housing to define an outer circumferential chamber therebetween, the outer circumferential chamber being open to the filler neck through the third conducting means to expose the outer circumferential portion to fuel vapor from the filler neck so that the first valve means is moved away from its blocking position toward its venting position allowing flow of fuel vapor from the outer circumferential chamber to the outlet tube during vehicle operation.

2. An apparatus for controlling venting of fuel vapors from a vehicle fuel tank having a filler neck, the apparatus comprising a housing defining an interior region and being formed to include a first inlet port connecting the interior region in fluid communication with the fuel tank, a signal port connecting the interior region in fluid communication with the filler neck, and an outlet port, a first valve assembly disposed in the interior region and movable between a blocking position and a venting position, the first valve assembly including a central portion, an intermediate annular portion concentric with the central portion, and an outer circumferential portion, a flow tube connecting the first inlet port with the central portion to expose the central portion to fuel vapor from the fuel tank, and an annular partition lying in spaced-apart relationship with the flow tube and cooperating therewith to define an intermediate annular chamber open to the outlet port to expose the intermediate portion to atmospheric pressure, the annular partition further cooperating with the housing to define an outer circumferential chamber open to the signal port to expose the outer circumferential portion to fuel vapor from the filler neck so that the first valve assembly is moved away from its blocking position toward its venting position in response to fuel vapor pressure received from the first inlet port and the signal port allowing flow of fuel vapor from the flow tube and the outer circumferential chamber to the intermediate annular chamber during vehicle operation.

3. The apparatus of claim 2, wherein the housing is formed to include a third inlet port connecting the interior region in fluid communication with the fuel tank and further comprising a second valve assembly movable between a blocking position blocking flow of fuel vapor from the third inlet port through the interior region to the outlet port when the first valve assembly is positioned in its venting position and a venting position allowing flow of fuel vapor to the interior region from the third inlet port when the first valve assembly is positioned in its blocking position during vehicle refueling.

4. The apparatus of claim 3, further comprising means for biasing the first valve assembly in opposition to the second valve assembly.

5. The apparatus of claim 3, wherein the second valve assembly includes a pressure-relief valve and a vacuum-relief valve mounted in an aperture formed in the pressure-relief valve.

6. The apparatus of claim 2 wherein the flow tube terminates in a first valve seat and the annular partition terminates in a second valve seat and the first valve assembly seats against both the first and second valve seats when positioned in its blocking position.

7. An apparatus for controlling venting of fuel vapors from a vehicle fuel tank having a filler neck, the apparatus comprising a housing defining an interior region and being formed to include a first inlet port connecting the interior region in fluid communication with the fuel tank, a signal port connecting the interior region in fluid communication with the filler neck, and an outlet port, a first valve assembly disposed in the interior region and movable between a blocking position preventing fuel vapor received from the first inlet port from flowing through the interior region to the outlet port and a venting position allowing fuel vapor received from the first inlet port to flow through the interior region to the outlet port, the first valve assembly including a central portion, an intermediate portion concentric with the central portion, and an outer circumferential portion, an outlet tube extending between the central portion and the outlet port to expose the central portion to atmospheric pressure, and a flow tube extending between the first inlet port and the intermediate portion to expose the intermediate portion to fuel vapor from the fuel tank, the flow tube extending into the interior region in spaced-apart relationship with the housing to define an outer circumferential chamber therebetween, the outer circumferential chamber being open to the signal port to expose the outer circumferential portion to fuel vapor from the filler neck so that the first valve assembly is moved away from its blocking position toward its venting position in response to fuel vapor pressure received from the first inlet port and the signal port allowing flow of fuel vapor from the flow tube and the outer circumferential chamber to the outlet tube during vehicle operation.

8. The apparatus of claim 7, wherein the housing is formed to include a second inlet port connecting the interior region in fluid communication with the fuel tank and further comprising a second valve assembly movable between a blocking position blocking flow of fuel vapor from the second inlet port through the interior region to the outlet port when the first valve assembly is positioned in its venting position and a venting position allowing flow of fuel vapor to the interior region from the second inlet port when the first valve assembly is positioned in its blocking position during vehicle refueling.

9. The apparatus of claim 8, further comprising means for biasing the first valve assembly in opposition to the second valve assembly.

10. The apparatus of claim 8, wherein the second valve assembly includes a pressure-relief valve and a vacuum-relief valve mounted in an aperture formed in the pressure-relief valve.

11. The apparatus of claim 7, wherein the flow tube terminates in first and second valve seats and the first valve assembly seats against the first and second valve seats when positioned in its blocking position.

12. A fuel vapor venting and recovery system for a fuel tank having a filler neck, the system comprising first means for venting fuel vapor from the fuel tank during vehicle operation, second means for venting fuel vapor from the fuel tank during vehicle refueling, and a control valve assembly movable between a first position allowing flow of fuel vapor through the first venting means and blocking flow of fuel vapor through the second venting means during vehicle operation and a second position blocking flow of fuel vapor through the first venting means and allowing flow of fuel vapor through the second venting means during vehicle refueling, the control valve assembly including a first valve assembly and means for communicating pressurized fuel vapor from the filler neck to the first valve assembly to move the control valve assembly toward the first position, the control valve assembly including a housing defining an interior region, the first valve assembly being positioned in the interior region and including a central portion, an intermediate portion concentric with the central portion, and an outer circumferential portion, and further comprising means for separating the interior region into an intermediate annular chamber open to the fuel vapor treatment site and an outer annular chamber open to the communicating means to expose the outer circumferential portion to fuel vapor pressure from the communicating means so that the control valve assembly is moved toward its first position allowing flow of fuel vapor from the first venting means and the outer annular chamber to the intermediate annular chamber during vehicle operation.

13. A fuel vapor venting and recovery system for a fuel tank having a filler neck, the system comprising first means for venting fuel vapor from the fuel tank during vehicle operation, second means for venting fuel vapor from the fuel tank during vehicle refueling, and a control valve assembly movable between a first position allowing flow of fuel vapor through the first venting means and blocking flow of fuel vapor through the second venting means during vehicle operation and a second position blocking flow of fuel vapor through the first venting means and allowing flow of fuel vapor through the second venting means during vehicle refueling, the control valve assembly including a first valve assembly and means for communicating pressurized fuel vapor from the filler neck to the first valve assembly to move the control valve assembly toward the first position, the control valve assembly including a housing defining an interior region, the first valve assembly being positioned in the interior region and including a central portion, an intermediate portion concentric with the central portion, and an outer circumferential portion, and further comprising first means for separating the interior region into an intermediate annular chamber open to the fuel vapor treatment site and an outer annular chamber open to the communicating means to expose the outer circumferential portion to fuel vapor pressure from the communicating means so that the control valve assembly is moved toward its first position allowing flow of fuel vapor from the first venting means and the outer annular chamber to the intermediate annular chamber during vehicle operation and second means for separating the interior region into a central chamber, open to the outlet port to expose the central portion to atmospheric pressure, an intermediate annular chamber open to the first valve means to expose the intermediate portion to fuel vapor pressure therefrom, and an outer circumferential chamber open to the communicating means to expose the outer circumferential portion to fuel vapor pressure therefrom so that the control valve assembly is moved toward its first position allowing flow of fuel vapor from the first venting means and the outer circumferential chamber to the intermediate chamber during vehicle operation.

* * * * *